US012684328B2

(12) United States Patent
Haran et al.

(10) Patent No.: US 12,684,328 B2
(45) Date of Patent: Jul. 14, 2026

(54) SUPPORT OF MOBILE WIRELESS DEVICES HAVING A PERMANENT ROAMING GEOGRAPHIC LOCATION USAGE PATTERN

(71) Applicant: T-Mobile Innovations LLC, Overland Park, KS (US)

(72) Inventors: Narayanan Haran, Hoffman Estates, IL (US); Narothum Saxena, Hoffman Estates, IL (US); Michael S. Irizarry, Barrington Hills, IL (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 592 days.

(21) Appl. No.: 17/860,532

(22) Filed: Jul. 8, 2022

(65) Prior Publication Data

US 2024/0015497 A1     Jan. 11, 2024

(51) Int. Cl.
| | |
|---|---|
| *H04W 8/02* | (2009.01) |
| *H04W 8/06* | (2009.01) |
| *H04W 24/08* | (2009.01) |
| *H04W 84/04* | (2009.01) |

(52) U.S. Cl.
CPC ............. *H04W 8/02* (2013.01); *H04W 24/08* (2013.01); *H04W 84/042* (2013.01)

(58) Field of Classification Search
CPC ........... H04W 8/02; H04W 8/06; H04W 8/12; H04W 24/08; H04W 84/042; H04W 60/04; H04W 8/08
See application file for complete search history.

(56) References Cited

U.S. PATENT DOCUMENTS

| | | | | |
|---|---|---|---|---|
| 11,864,264 B2 * | 1/2024 | Kim | ......................... | H04W 8/02 |
| 12,015,734 B2 * | 6/2024 | Qiao | ....................... | H04W 8/22 |
| 12,089,289 B2 * | 9/2024 | Ramprasad | ........... | H04W 36/30 |
| 12,262,447 B2 * | 3/2025 | Kim | ......................... | H04W 8/12 |
| 2015/0350874 A1 * | 12/2015 | Draznin | .................. | H04W 8/12 |
| | | | | 455/432.1 |
| 2022/0141641 A1 * | 5/2022 | Ramprasad | ........... | H04W 36/32 |
| | | | | 370/329 |

(Continued)

*Primary Examiner* — Khawar Iqbal
(74) *Attorney, Agent, or Firm* — SHOOK, HARDY & BACON L.L.P.

(57) ABSTRACT

A system and method are described for supporting permanent roaming for a user equipment (UE) device, which is carried out by a permanent roaming coordinator component, in a mobile wireless network environment including a plurality of public land mobile network (PLMN) carriers within a mobile wireless geographic region. The method includes accessing a current permanent roaming policy applicable to the mobile wireless geographic region within which the UE device resides. The method further includes applying the current permanent roaming policy to establish a current preferred PLMN for supporting a roaming mobile wireless network connection by the UE device, and resetting a usage counter parameter for the UE device in accordance with designating the current preferred PLMN for the UE device. Thereafter, the permanent roaming coordinator component monitors, while the current preferred PLMN supports roaming mobile wireless communications for the UE device, a current status of the usage counter parameter for the UE device.

18 Claims, 3 Drawing Sheets

(56)                  References Cited

U.S. PATENT DOCUMENTS

| | | | |
|---|---|---|---|
| 2023/0099315 A1* | 3/2023 | Papageorgiou | H04W 8/18 |
| | | | 370/259 |
| 2023/0132454 A1* | 5/2023 | Kim | H04M 15/66 |
| | | | 370/329 |
| 2023/0269689 A1* | 8/2023 | Park | H04W 24/04 |
| | | | 455/432.1 |
| 2024/0015497 A1* | 1/2024 | Haran | H04W 24/08 |
| 2024/0147207 A1* | 5/2024 | Watfa | H04W 12/106 |
| 2024/0236718 A9* | 7/2024 | Aghili | H04W 36/24 |
| 2024/0267993 A1* | 8/2024 | Chun | H04W 24/02 |

* cited by examiner

| MCC 210 | MNC 220 | MSIN 230 |
|---------|---------|----------|

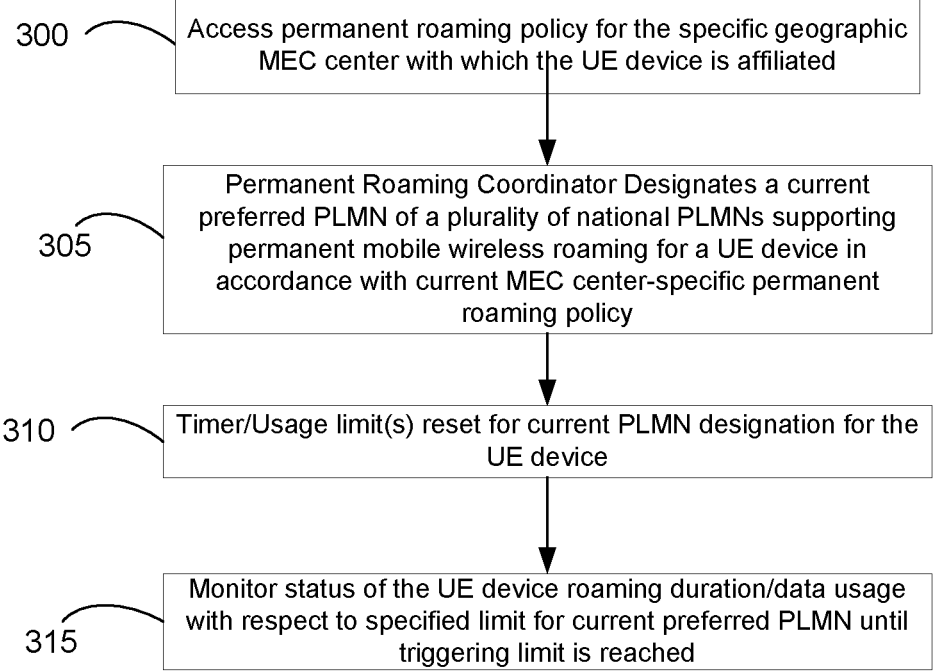

300 — Access permanent roaming policy for the specific geographic MEC center with which the UE device is affiliated 305 — Permanent Roaming Coordinator Designates a current preferred PLMN of a plurality of national PLMNs supporting permanent mobile wireless roaming for a UE device in accordance with current MEC center-specific permanent roaming policy 310 — Timer/Usage limit(s) reset for current PLMN designation for the UE device 315 — Monitor status of the UE device roaming duration/data usage with respect to specified limit for current preferred PLMN until triggering limit is reached

FIG. 4

SUPPORT OF MOBILE WIRELESS DEVICES HAVING A PERMANENT ROAMING GEOGRAPHIC LOCATION USAGE PATTERN

FIELD OF THE INVENTION

The present disclosure generally relates to mobile wireless communications. More particularly, the present disclosure is directed to enhanced management of devices used for extended timer periods at a same remote location that is served by multiple host carriers of roaming devices.

BACKGROUND OF THE INVENTION

Mobile wireless technology has experienced vast improvements in both the ability to handle vast volumes of information at high speeds as well as handling high numbers of simultaneous users by radio access network (RAN) nodes. Additionally the cost of subscribing to mobile wireless network services has reduced relative to the amount of data and service levels (data rates) provided to subscribers. Additionally, the cost of incorporating mobile wireless communications capabilities into a variety of machines/devices has fallen substantially. The result is that mobile wireless services are now economically practical for a variety of Internet of Things (IoT) and Machine-to-Machine (M2M) applications. Examples of such devices include: smart sensors, smart devices, industrial process control sensors and/or actuators, light bulbs, light switches, etc.

In that regard, certain types of mobile wireless devices (e.g. M2M and IoT devices) are of a type that have usage patterns that make the mobile wireless devices (also referred to as user equipment, or UE for short) suitable candidates for operating under agreements with non-national mobile wireless carriers. In such case, the UEs rely upon roaming agreements reached between their non-national carrier and national carriers. In such cases, the UEs are expected to operate their entire lifetime as a roaming device connecting via a radio access network of a national public land mobile network (PLMN). The PLMN, in turn, provides a tunneling link through its core network to a home network of the non-national virtual PLMN.

A challenge potentially arises when implementing permanent roaming with IoT and M2M devices that operate over their lifetime at essentially a single geographic location. In such cases it can be difficult to maintain operation with a roaming status with a single hosting PLMN for an extended period. After a period of continuous presence on the PLMN carrier network, further continuous use may not be possible. The potential inability to operate over entire lifetime with a single PLMN presents a challenge to providers of IoT and M2M devices seeking to minimize the setup and maintenance of mobile wireless communications for such devices once they are purchased by users that may exist in any of a number of locations in a national market.

SUMMARY OF THE INVENTION

To address technical challenges faced during setting up non-mobile UE devices that are expected to remain stationary and at a region that is not served by a non-national service associated with the UE device(s), a system and method are disclosed for supporting permanent roaming for a user equipment (UE) device, that is carried out by a permanent roaming coordinator component, in a mobile wireless network environment including a plurality of public land mobile network (PLMN) carriers within a mobile wireless geographic region. The method includes accessing a current permanent roaming policy applicable to the mobile wireless geographic region within which the UE device resides. The method further includes applying the current permanent roaming policy to establish a current preferred PLMN for supporting a roaming mobile wireless network connection by the UE device, and resetting a usage counter parameter for the UE device in accordance with designating the current preferred PLMN for the UE device. Thereafter, the permanent roaming coordinator component monitors, while the current preferred PLMN supports roaming mobile wireless communications for the UE device, a current status of the usage counter parameter for the UE device.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 4 is a flow diagram summarizing an exemplary set of operations carried out in accordance with the present disclosure.

DETAILED DESCRIPTION OF THE DRAWINGS

A system, in accordance with the present disclosure, includes mobile edge computing environment for implementing enhanced permanent roaming of UE devices. In accordance with the disclosure, permanent roaming is supported for UE devices arranged according to mobile edge computing (MEC) centers that correspond to geographic regions supported by at least two available PLMN carriers to which a same UE may be administratively switched through automated processes carried out by a roaming policy server.

Figure 1:
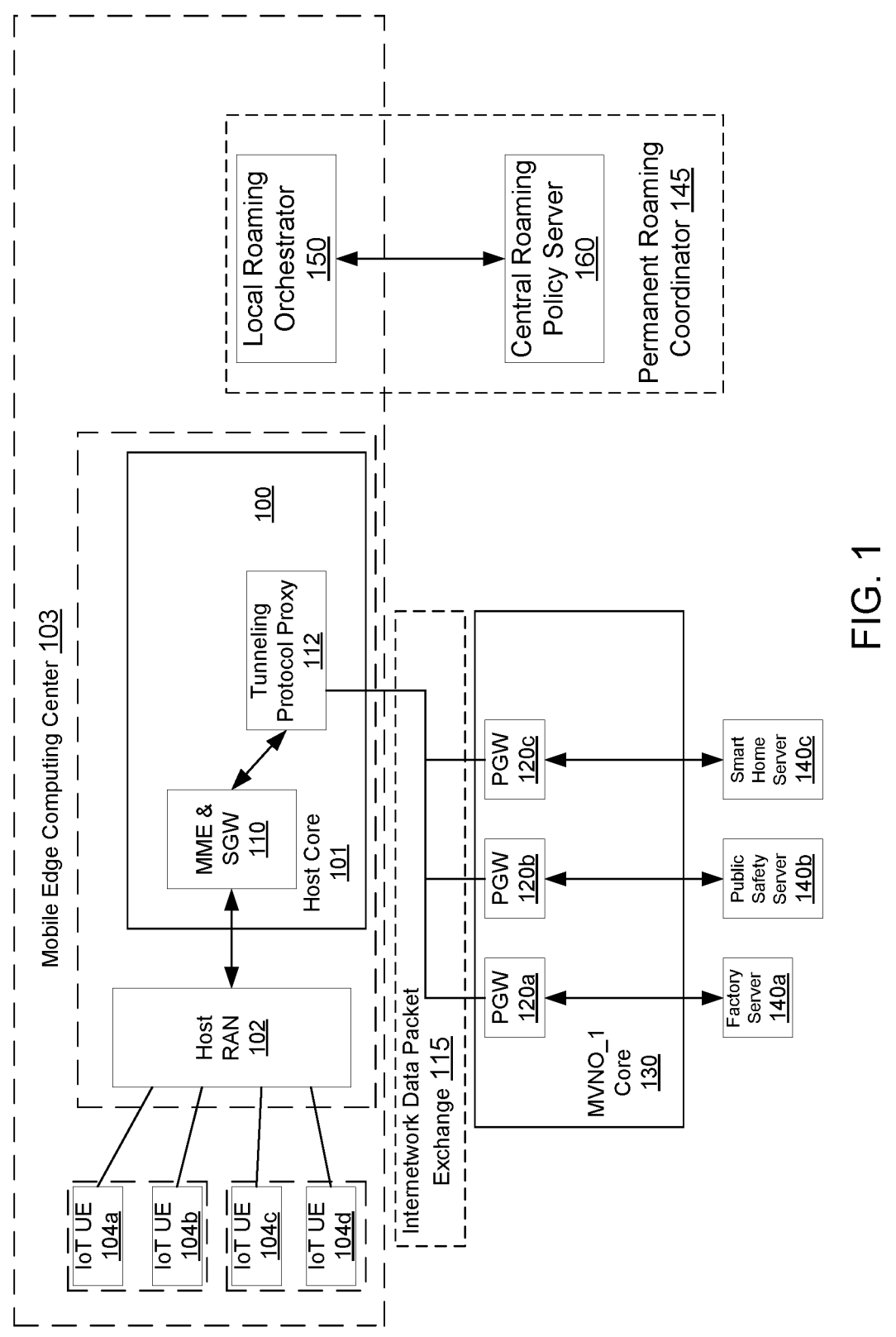
FIG. 1 is a schematic diagram of an exemplary mobile wireless network radio network environment within which enhanced permanent roaming is supported through active management of PLMN carrier designations supporting a particular roaming UE in accordance with the present disclosure.

Turning to FIG. 1, an exemplary environment is schematically depicted where a first available PLMN carrier 100, including a host core network 101 and a host RAN 102, hosts multiple permanently roaming UE devices. User equipment 104a, 104b, 104c and 104d are associated with a first non-national PLMN carrier having a mobile virtual network operator (MVNO_1) core 130.

In accordance with the illustrative example, the MVNO_1 does not have national reach and therefore relies upon the first available PLMN carrier 100 to provide support for a roaming connection session between the permanent roaming UE devices 104a-d and the MVNO_1 core 130. The user equipment 104a-d issue connection requests and connect, via an internetwork data packet exchange 115, to their corresponding core network (MVNO_1 core 130) through the host RAN 102 and the host core 101 of the first available PLMN carrier 100. Though not depicted in FIG. 1 to avoid clutter, each of a plurality of available PLMN carriers, such as carrier 100 are present in a given geographic area unit (referred to herein as a MEC center).

With continued reference to FIG. 1, a simplified depiction is provided of the MVNO_1 core 130 to depict and demonstrate an illustrative use of the present disclosure (i.e. connection of IoT devices to corresponding servers via permanent roaming connections passing through an available PLMN carrier and thereafter a non-national (virtual) PLMN. The MVNO_1 core 130 is accessed via a plurality of PGWs, including PGWs 120a, 120b and 120c through which user equipment are connected to services provided by particular servers. In the illustrative example, PGW 120a provides access to factory server 140a, PGW 120b provides access to factory server 140b, and PGW 120c provides access to factory server 140c.

In accordance with the illustrative example, a connection request by any one of the user equipment 104a-d is passed via the host RAN 102 to a mobility management entity (MME) and source gateway (SGW) 110 of the host core network 101. The request, including both a unique mobile subscriber identification (e.g. an international mobile subscriber identity—IMSI) and an access point name string (e.g. access point name—APN) is received and processed by the MME/SGW 110.

Figures 2, 3:
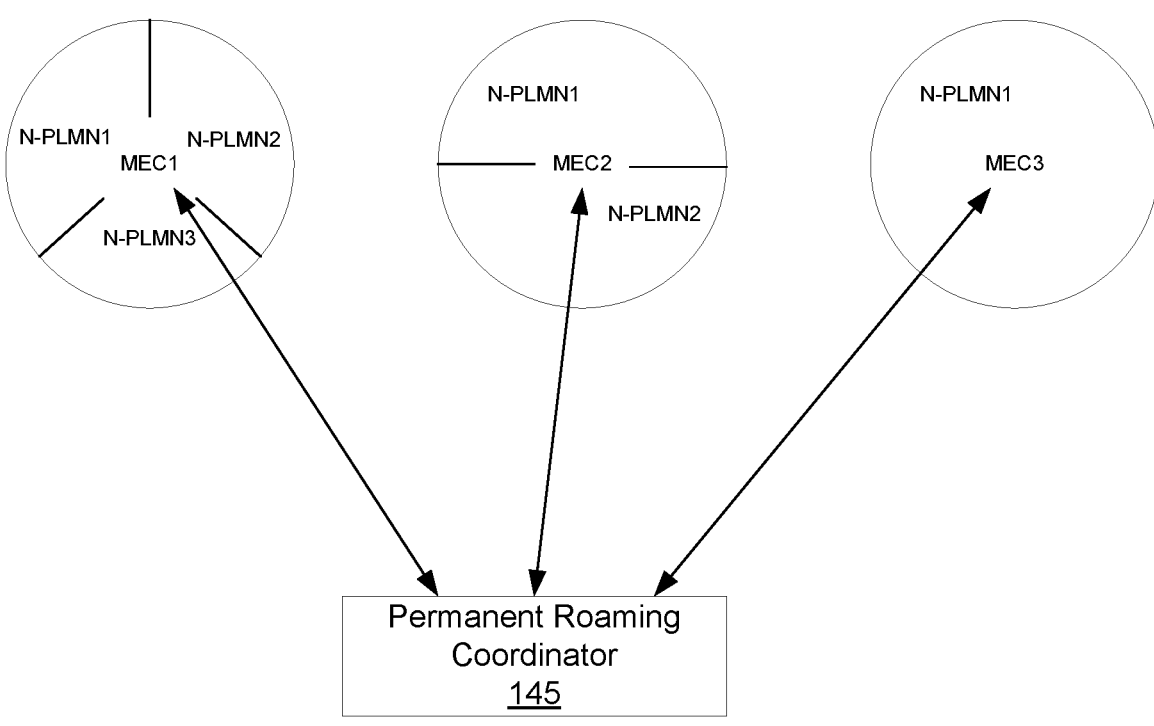
FIG. 2 is a schematic depiction of an international mobile subscriber identity field in accordance with the disclosure.
FIG. 3 is a schematic diagram depicting a centralized arrangement for managing permanent roaming of UE devices in accordance with the present disclosure.

Turning briefly to FIG. 2, an illustrative example is provided of an IMSI including a mobile country code (MCC) 210, a mobile network code 220, and a mobile subscriber identity number (MSIN) field 230. In an illustrative example, the MCC field is three numbers (digits) long, the MNC field 220 is three numbers long, and the MSIN is nine digits long.

The MME/SGW 110 is configured, for example, to carry out well known on-network authentication via each MVNO's respective home subscriber server (HSS), location/session management. In accordance with illustrative examples, the MME/SGW 110 is configured to recognize and selectively route requests from hosted MVNO user equipment, which are identified by particular ranges (e.g. 1 million per distinct MVNO identifier) of MSIN values corresponding to user equipment of hosted MVNOs, to a tunneling protocol proxy 112 (e.g. a GPRS Tunneling Protocol Proxy). By way of example, the MME/SGW 110 is configured with Name Authority Pointer (NAPTR) records that resolve the provided APN and IMSI to an instance of the tunneling protocol proxy 112 geographically closest to the requesting one of the user equipment 104a-d.

With continued reference to FIG. 1, the tunneling protocol proxy 112, by way of example, is configured set up a session, through the host core network 101, connecting the user equipment, via the internetwork data packet exchange 115, to a corresponding PGW of an MVNO associated with the requesting one of the user equipment 104a-d.

In accordance with the current disclosure, a permanent roaming coordinator component 145 is provided to actively manage available PLMN carrier designations for the UE devices 104a-d within the MEC center 103. In the illustrative example, the permanent roaming coordinator includes a local roaming orchestrator 150 that carries out instructions within the scope of the MEC center 103 in accordance with permanent roaming policies (e.g. time durations, data volumes, QoS availability, etc.) maintained by a central roaming policy server 160—including initialization and subsequent updates to the policies of various available PLMN carriers. In an illustrative example, the local roaming orchestrator 150 executes permanent roaming policies in the MEC center 103 in accordance with a most recent version of permanent roaming policy provided by the central roaming policy server 160.

Alternatively, the permanent roaming coordinator component 145 operates directly to manage policies for various available PLMN carriers with respect to permanently roaming devices, and actively reconfiguring designated available PLMN carriers for individual permanently roaming devices organized/affiliated with particular MEC centers served by various combinations of available PLMN carriers. In such case, a mapping is maintained by the permanent roaming coordinator component 145 of permanently roaming UE devices and geographically specified MEC centers.

Turning to FIG. 3, an exemplary arrangement depicts the permanently roaming available PLMN partners available for each of three distinct MEC centers (MEC1, MEC2, and MEC3). MEC1 corresponds to a region served by three distinct available PLMNs, MEC2 corresponds to another region served by two distinct available PLMNs, and MEC3 is served by only a single available PLMN. Each MEC center covers a geographic market area served by a specified set of available PLMNs supporting permanent roaming. The local roaming orchestrator 150 identifies permanent roaming UE devices and distributes the designation of PLMNs for devices across the multiple available PLMNs for a particular MEC center. Thereafter, the local roaming orchestrator 150 performs switching between the multiple available PLMNs for the particular MEC center with which the UE devices are associated in accordance with designated triggering conditions (e.g. time limit reached since previous switch to current PLMN, data usage limit reached, etc.). In addition to applying a current PLMN switching policy to UE devices associated with specified MEC centers, the local roaming orchestrator 150 periodically communicates with the central roaming policy server 160 for updates to MEC center-specific policy changes. Notably, the MEC1 center cannot support the enhanced permanent roaming in accordance with the illustrative examples provided herein since there is no other PLMN available to perform a switch when a time duration/data usage limit is reached for a particular permanently roaming UE device.

Table 1 below summarizes an exemplary manner of the arrangement of FIG. 3 being registered within a configuration database maintained by the permanent roaming coordinator 145.

TABLE 1

| MEC Market | Permanent roaming options | | |
|---|---|---|---|
| MEC1 | PLMN1 | TACi:1 –> n | ECGIi:1 –> m |
| | PLMN2 | TACi:1 –> n | ECGIi:1 –> m |
| | PLMN3 | TACi:1 –> n | ECGIi:1 –> m |
| MEC2 | PLMN2 | TACj:1 –> n | ECGIj:1 –> m |
| | PLMN3 | TACj:1 –> n | ECGIj:1 –> m |
| MEC3 | PLMN2 | TACk:1 –> n | ECGIk:1 –> m |

The Table 1 identifies three distinct mobile edge computing centers (MEC1, MEC2, and MEC3). For each MEC center (market), a set of available PLMNs is enumerated under permanent roaming options. In the case of MEC1, three PLMNs are available (PLMN1, PLMN2, PLMN3). Each PLMN within a particular MEC center is delegated particular ranges of values for identifying cell groups (e.g., TACi:1 to n) for a particular PLMN in a particular MEC center. Similarly, each PLMN within a particular MEC center is delegated particular ranges of values for identifying RAN nodes/cells (e.g., ECGIi:1 to m) for a particular PLMN in a particular MEC center and particular RAN node/cell group.

Importantly, for each permanently roaming UE device, the permanent roaming coordinator 145 maintains a current status of a measuring parameter (e.g. a remaining current time or remaining data usage) associated with an allocated time duration/data usage limit for carrying out permanent roaming with a currently designated available PLMN carrier in accordance with roaming policies maintained by the permanent roaming coordinator 145. In accordance with the current disclosure, and with continued reference to FIG. 3, when the policy-specified time duration/data usage limit is reached for a particular UE device within a MEC center (e.g., MEC1), the permanent roaming coordinator 145 designates another PLMN, of multiple available (e.g., national) PLMNs supporting the permanently roaming UE device (e.g., switching from N-PLMN1 to N-PLMN2 in MEC1), as the preferred PLMN. For example, as the UE device 104*a* operating in MEC center 103 (corresponding to MEC1 of FIG. 3) approaches a 6 month time limit for continuous use of N-PLMN1 (in accordance with an agreement established between the MVNO_1 operator and the N-PLMN1 operator), the permanent roaming coordinator 145 issues an administrative message to the UE device 104*a* to re-config-ure the roaming service provider table of the UE device 104*a* to move the N-PLMN1 operator to the lowest priority of available PLMNs associated with the MEC center 103—rendering the N-PLMN2 operator the preferred permanently roaming carrier for the UE device 104*a*. Thereafter, the UE device 104*a* time duration is reset to commence a period of preferably connecting to the N-PLMN2 carrier in accor-dance with permanent roaming support scheme described herein. In practice, the designation of a new preferred PLMN is carried out by re-ranking the multiple available PLMNs for a particular MEC center so that the preferred PLMN is given the highest rank of a list of the available PLMNs in the MEC center for the UE device.

Turning to FIG. 4, a flowchart summarizes operation of the permanent roaming coordinator 145 in accordance with the present disclosure. Initially, during 300, the permanent roaming coordinator 145 accesses/obtains a current perma-nent roaming policy applicable to a UE device located in a region associated with a particular MEC center.

Thereafter, during 305, the current permanent roaming policy is applied to establish a current preferred PLMN designated for supporting a roaming mobile wireless net-work connection by the UE device. By way of example, during 305, the permanent roaming coordinator 145 applies a PLMN carrier selection/switching rule of the current permanent roaming policy to determine the PLMN carrier that will support the UE device during mobile wireless communications. Even more specifically, during 305 the permanent roaming coordinator 145 applies a switching rule based upon a number of currently available distinct PLMN carriers available for a particular MEC center (market) associated with a geographic region within which the per-manently roaming UE device is located.

During 310, a UE device instance-specific timer/data counter is reset for a currently designated preferred PLMN carrier for supporting a roaming mobile wireless connection for the UE device. In a particular example, a remaining time value (e.g., 6 months) is set that is thereafter decremented on a daily basis until no remaining time exists. Alternatively, a remaining data usage (e.g. 1 Gbytes) is set that is decre-mented as the permanently roaming UE device operates with the newly designated preferred PLMN.

During 315, the coordinator 145 monitors a current status of the UE device roaming time duration/data usage after the reset performed during 310. Such monitoring continues until the specified time duration/data usage limit (e.g., the time/data usage remaining expires) is reached by the UE device while supported during roaming mobile wireless communi-cations by the currently designated preferred PLMN. At which point, control of operation returns to 300. While FIG. 3 summarizes a single permanent roaming management cycle on a single UE device, it should be understood that a single permanent roaming coordinator 145 will manage hundreds, thousands, tens of thousands, hundreds of thou-sands, or even millions of permanent roaming UE devices in accordance with the current disclosure.

It is noted however, that the permanent roaming coordi-nator 145 may, at any time update the current policy applied to the MEC center-specific permanent roaming support being handled by a switched set of available PLMN carriers. Such changes may comprise changes to time/data usage limits (potentially designated on a specific PLMN basis), the list of available PLMNs for designation as preferred PLMN during switching at step 305 discussed herein above, etc.

All references, including publications, patent applica-tions, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (espe-cially in the context of the following claims) are to be construed to cover both the singular and the plural, unless otherwise indicated herein or clearly contradicted by con-text. The terms "comprising," "having," "including," and "containing" are to be construed as open-ended terms (i.e., meaning "including, but not limited to,") unless otherwise noted. Recitation of ranges of values herein are merely intended to serve as a shorthand method of referring indi-vidually to each separate value falling within the range, unless otherwise indicated herein, and each separate value is incorporated into the specification as if it were individually recited herein. All methods described herein can be per-formed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly con-tradicted by context.

What is claimed is:

1. A method for supporting permanent roaming for a user equipment (UE) device, that is carried out by a permanent roaming coordinator component, in a mobile wireless network environment including a plurality of public land mobile network (PLMN) carriers within a mobile wireless geographic region, the method comprising:

accessing a current permanent roaming policy applicable to the mobile wireless geographic region within which the UE device resides, wherein the current permanent roaming policy specifies a PLMN carrier switching rule for selecting a new current preferred PLMN providing roaming mobile wireless services for the UE device;

applying the current permanent roaming policy to establish a current preferred PLMN for supporting a roaming mobile wireless network connection by the UE device;

in direct response to applying the current permanent roaming policy to establish the current preferred PLMN for the UE device, resetting a usage counter parameter for the UE device, wherein the resetting is performed only upon the designation of a new current preferred PLMN under the permanent roaming policy; and monitoring, while the current preferred PLMN supports roaming mobile wireless communications for the UE device, a current status of the usage counter parameter for the UE device, wherein the usage counter parameter corresponds to a time duration of a period during which the UE device is connected to the current preferred PLMN, the time duration commencing upon the resetting of the usage counter parameter in direct response to the application of the permanent roaming policy to establish the current preferred PLMN for the UE.

2. The method of claim 1, wherein the usage monitoring is sustained to determine when a triggering limit is indicated by the usage counter parameter.

3. The method of claim 1, wherein the mobile wireless geographic region corresponds to a mobile edge computing (MEC) center.

4. The method of claim 1, wherein the usage counter parameter further corresponds to a byte count for data usage by the UE device.

5. The method of claim 1, wherein the usage counter parameter is maintained on a UE device instance basis so that each managed permanently roaming UE device is assigned a dedicated usage counter instance.

6. The method of claim 1, wherein the plurality of PLMN carriers are national earners.

7. The method of claim 2, wherein the method is carried out in a continuous cycle such that when the monitoring results in a determination that the triggering limit is reached, a new cycle begins with the accessing operation.

8. The method of claim 1, wherein the permanent roaming coordinator component is incorporated into the core network of a mobile virtual network operator.

9. The method of claim 1, wherein the UE device is an Internet of Things (IoT) device.

10. A permanent roaming coordinator component configured for supporting permanent roaming for a user equipment (UE) device, in a mobile wireless network environment including a plurality of public land mobile network (PLMN) carriers within a mobile wireless geographic region, wherein the coordinator component comprises:

a processor; and a non-transitory computer-readable medium comprising computer-executable instructions that, when executed by the processor, facilitate carrying the method comprising:

accessing a current permanent roaming policy applicable to the mobile wireless geographic region within which the UE device resides, wherein the current permanent roaming policy specifies a PLMN carrier switching rule for selecting a new current preferred PLMN providing roaming mobile wireless services for the UE device;

applying the current permanent roaming policy to establish a current preferred PLMN for supporting a roaming mobile wireless network connection by the UE device;

in direct response to applying the current permanent roaming policy to establish the current preferred PLMN for the UE device, resetting a usage counter parameter for the UE device, wherein the resetting is performed only upon the designation of a new current preferred PLMN under the permanent roaming policy; and monitoring, while the current preferred PLMN supports roaming mobile wireless communications for the UE device, a current status of the usage counter parameter for the UE device, wherein the usage counter parameter corresponds to a time duration of a period during which the UE device is connected to the current preferred PLMN, the time duration commencing upon the resetting of the usage counter parameter in direct response to the application of the permanent roaming policy to establish the current preferred PLMN for the UE.

11. The permanent roaming coordinator component of claim 10, wherein the usage monitoring is sustained to determine when a triggering limit is indicated by the usage counter parameter.

12. The permanent roaming coordinator component of claim 10, wherein the mobile wireless geographic region corresponds to a mobile edge computing (MEC) center.

13. The permanent roaming coordinator component of claim 10, wherein the usage counter parameter further corresponds to a byte count for data usage by the UE device.

14. The permanent roaming coordinator component of claim 10, wherein the usage counter parameter is maintained on a UE device instance basis so that each managed permanently roaming UE device is assigned a dedicated usage counter instance.

15. The permanent roaming coordinator component of claim 10, wherein the plurality of PLMN carriers are national carriers.

16. The permanent roaming coordinator component of claim 11, wherein the method is carried out in a continuous cycle such that when the monitoring results in a determination that the triggering limit is reached, a new cycle begins with the accessing operation.

17. The permanent roaming coordinator component of claim 10, wherein the permanent roaming coordinator component is incorporated into the core network of a mobile virtual network operator.

18. The permanent roaming coordinator component of claim 10, wherein the UE device is an Internet of Things (IoT) device.

* * * * *